Patented May 9, 1933

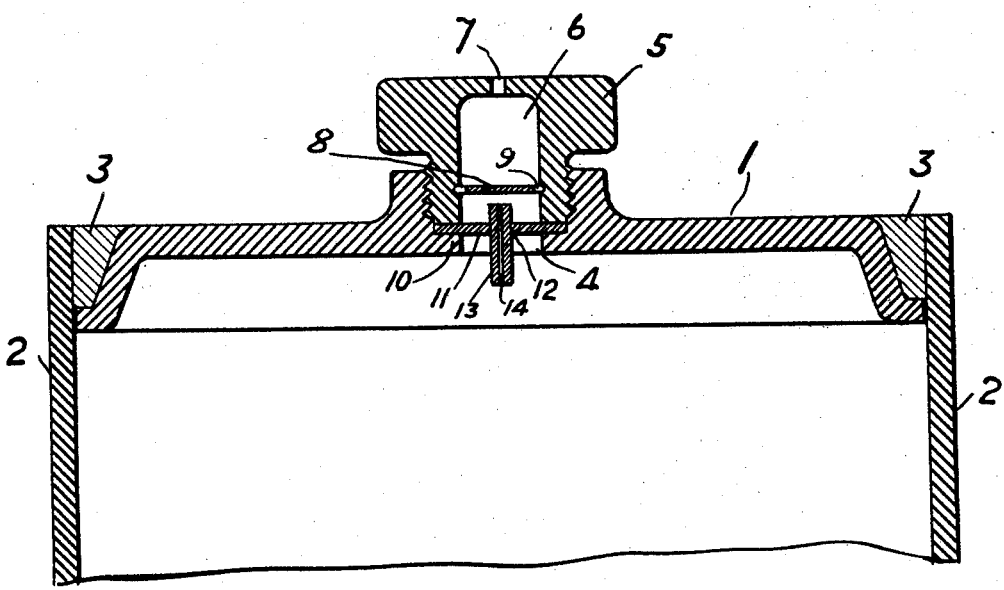

1,907,911

UNITED STATES PATENT OFFICE

CURTIS C. WALLACE AND GEORGE E. PETROSKY, OF PHILADELPHIA, PENNSYLVANIA

VENTING MEANS FOR STORAGE BATTERY CELLS

Application filed June 4, 1928. Serial No. 282,677.

Our invention applies to venting means, particularly applicable to storage battery cells in a charged and dumped condition, that is cells in which the plates have been fully charged and from which the electrolyte has been removed for purposes of convenience in storage and transportation. For a cell in such condition, it is desirable to provide venting means which will permit the escape of the small amount of gas evolved from the plates of a dumped battery while standing in a charged condition but at the same time will prevent or retard the diffusion of air into the cell. If air is permitted to diffuse into the cell while standing in a charged and dumped condition, the negative plates will rapidly oxidize and lose their charge. A venting device to accomplish these purposes should be provided with a duct from the interior to the exterior of the cell of minute cross section as compared with its length, the cell being otherwise hermetically sealed.

In accordance with our invention, we provide a venting device of this character which is inexpensive and effective and easily assembled in combination with a vent plug of a standard design.

Our invention will be more clearly understood by referring to the single figure of the accompanying drawing which shows in elevational section the upper part of a storage battery cell provided with a venting device embodying features of our invention.

In the drawing, 1 is the cover of the cell and 2 indicates the upper portions of the walls of the cell. The cover is sealed to the cell walls by means of sealing compound 3 located in a channel provided between the sides of the cover and the inner surface of the cell walls at the top thereof. The cover is provided with a vent opening 4, into which is fitted by means of screw thread engagement a vent plug 5, which may be of any well known design.

As here shown, this vent plug has an internal spray trapping chamber 6 opening below into the interior of the cell and having a small vent orifice 7 at the top communicating with the external air. A diaphragm 8 is located across the chamber 6 near the bottom thereof, having notches 9 at opposite points of its periphery, this diaphragm acting as a spray baffle during the normal operation of the cell. Around the opening 4 of the cell cover 1 is an internally projecting ledge 10, and on the upper surface of this ledge is seated a diaphragm 11 of pliable material such as soft rubber which is held in place by the pressure exerted by the lower edge of the vent plug 5 when this is screwed into position. The diaphragm 11 is provided with a perforation 12 more or less centrally located, into which is fitted a piece of tubing of rubber or similar material 13, which provides a duct 14 of small diameter as compared with its length between the interior of the cell and the chamber 6 through which the gases developed in the cell may pass to the external air. The diameter of the duct 14 is sufficiently small to prevent or appreciably retard the diffusion of air into the cell. The tube 13 fits snugly into the orifice 12 of the diaphragm 11, and as stated above, the diaphragm 11 is forcibly seated upon the shoulder 10 so that there is no opening between the interior of the cell and the external air except through the duct 14.

When it is necessary to add electrolyte to the cell in order to put it into service, the vent plug 5 is removed and the diaphragm 11 with the tube 13 is also removed and discarded, leaving the vent opening 4 free for adding liquid, taking hydrometer readings, and the like.

The assembly of the diaphragm 11 and the tube 13 may be made with inexpensive materials, the diaphragm being cut from ordinary soft rubber sheet and the tubing being a standard product, thus making the combination simple and inexpensive and easy to apply. While we have shown the diaphragm 11 and the tube 13 as two separate parts, assembled as a unit, they might of course be made in one piece without departing from the spirit of our invention.

We claim:

The combination of a battery in a charged and dumped condition containing a residue of electrolyte and having a closure provided with an internally shouldered filling and venting opening, a diaphragm adapted to seat on the shoulder of the vent opening and having an elongated body projecting through and above said diaphragm, said body having therein a permanently open vent of such minute cross-section compared to its length that the gases produced by local action between the residue of electrolyte and the active material of the plates are caused to escape at a velocity which substantially offsets the diffusion of air into the cell, and a vent plug providing a passage adequate for the escape of gas and adapted to trap entrained spray during normal charge, said vent plug designed for insertion in the vent opening to clamp the diaphragm on the shoulder during storage and shipment, and permit discarding the diaphragm and the body while retaining the spray trap feature after the battery is filled with electrolyte and put in service.

CURTIS C. WALLACE.
GEORGE E. PETROSKY.